A. B. AND B. H. PHISTER.
FIRE EXTINGUISHER.
APPLICATION FILED APR. 1, 1918. RENEWED JULY 17, 1920.
1,356,657.
Patented Oct. 26, 1920.
2 SHEETS—SHEET 1.
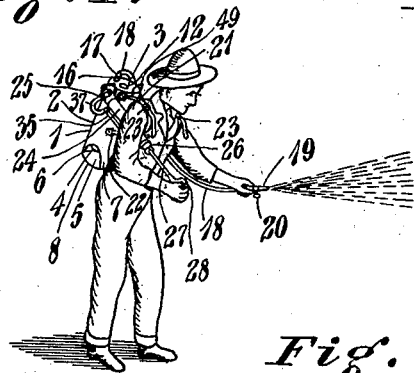
Fig. 1.
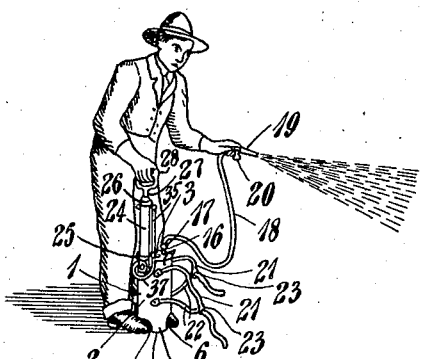
Fig. 2.
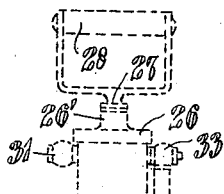
Fig. 3.
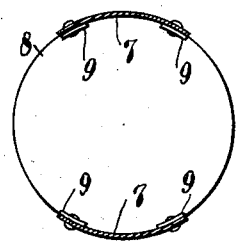
Fig. 5.
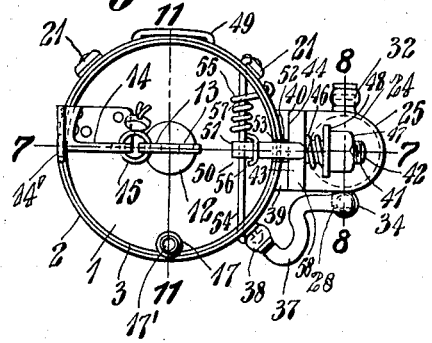
Fig. 4.
Fig. 6.
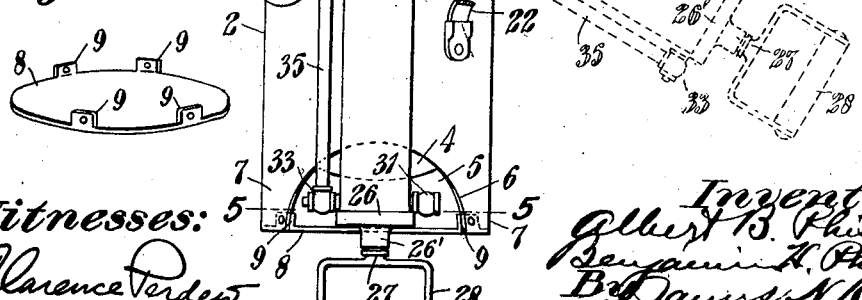
Witnesses:
Clarence Perdew
Irene Parker
Inventors
Albert B. Phister
Benjamin H. Phister
By James N. Ramsey
Attorney.

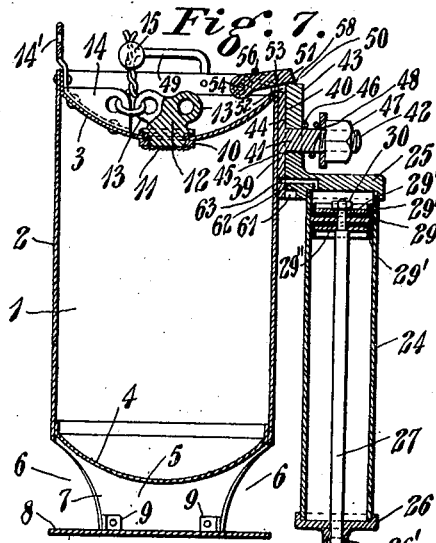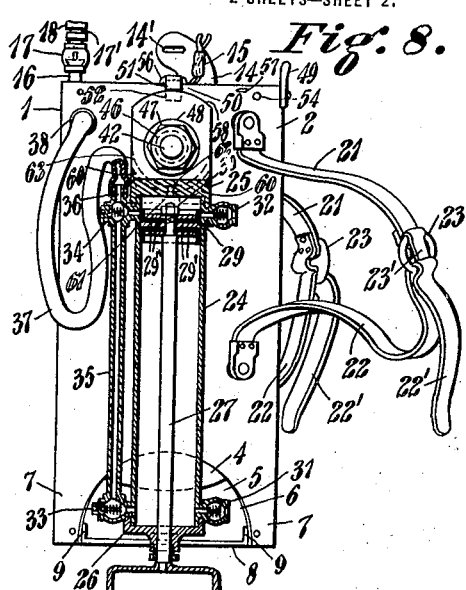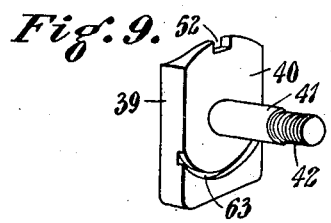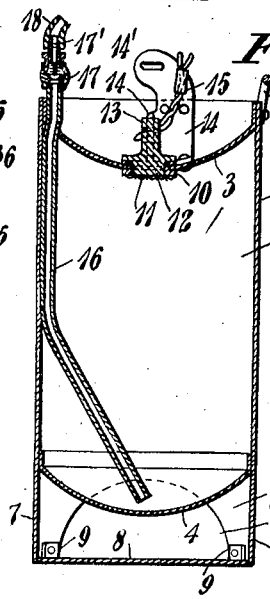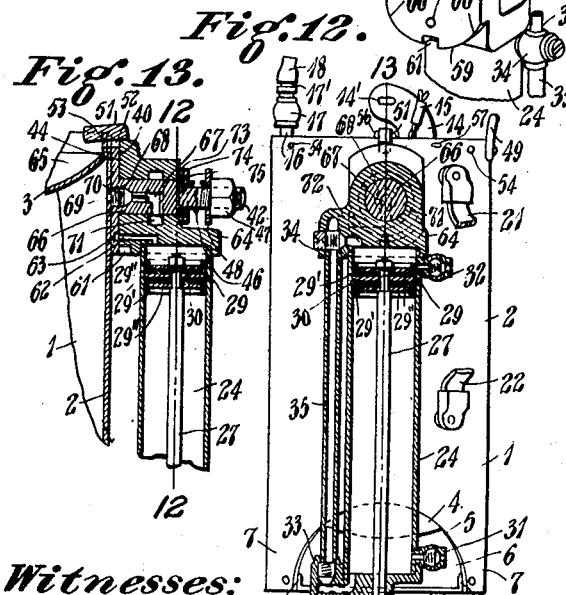

UNITED STATES PATENT OFFICE.

ALBERT B. PHISTER, OF FORT THOMAS, KENTUCKY, AND BENJAMIN H. PHISTER, OF CHICAGO, ILLINOIS.

FIRE-EXTINGUISHER.

1,356,657.  Specification of Letters Patent.  Patented Oct. 26, 1920.

Application filed April 1, 1918, Serial No. 225,997. Renewed July 17, 1920. Serial No. 397,153.

*To all whom it may concern:*

Be it known that we, ALBERT B. PHISTER and BENJAMIN H. PHISTER, citizens of the United States, residing at Fort Thomas, in the county of Campbell and State of Kentucky, and Chicago, in the county of Cook and State of Illinois, respectively, have invented certain new and useful Improvements in Fire-Extinguishers, of which the following is a specification.

Our invention relates to chemical fire-extinguishers, and its object is to provide devices of this character which will be of ample capacity yet readily portable and convenient to operate, and which will be more durable and dependable.

Our invention consists in the combination of parts and in the details of construction and arrangement of parts as will hereinafter be more fully described and claimed.

In the drawings:

Figure 1 is a perspective view of a device embodying our invention, showing how it is used when carried on the back of the user;

Fig. 2 is a similar view showing how the device is used when held on the floor or ground;

Fig. 3 is an enlarged side elevation of the device, the pump being shown in folded position by full lines and in two other positions by dotted lines, and part of the discharging hose and nozzle and parts of the straps being omitted;

Fig. 4 is a plan view corresponding to Fig. 3;

Fig. 5 is a horizontal cross-section on a plane corresponding to the line 5—5 of Fig. 3;

Fig. 6 is a detail perspective view of the foot-plate;

Fig. 7 is a vertical longitudinal section on a plane corresponding to the line 7—7 of Fig. 4;

Fig. 8 is a vertical cross-section on a plane corresponding to the line 8—8 of Fig. 4 looking to the left, and showing the main part of the device and the straps thereon, in elevation;

Fig. 9 is a detail perspective view of the swivel-bracket and stud;

Fig. 10 is a similar view of the upper part of the pump;

Fig. 11 is a vertical cross-section on a plane corresponding to the line 11—11 of Fig. 4;

Fig. 12 is a vertical cross-section similar to Fig. 8, but with parts of the straps omitted and showing a modification of the pump and its connection to the tank, the cross-section being on a plane corresponding to the line 12—12 of Fig. 13;

Fig. 13 is a partial vertical longitudinal section similar to Fig. 7, but further illustrating the modification of Fig. 12, the section being on a plane corresponding to the line 13—13 of Fig. 12;

The device which we disclose herein as an example of our invention includes a tank 1 which is made up of an upright tubular shell 2 having an upper head 3 properly flanged and dished downwardly and inwardly, with its flange suitably secured to the shell 2 all around, as by riveting and calking, or soldering. The lower head 4 is similarly dished and flanged and secured to the shell 2, but some distance upward from the lower end of the shell, leaving a space 5 below the convex lower side of the bottom 4 within the lower end part of the shell 2. This lower end part of the shell 2 is cut away at opposite sides of this space 5; there being, as here shown, substantially semi-circular recesses 6 extending up from the lower rim of the shell 2 nearly to where the lower head 4 is attached to the shell 2 and leaving opposite to each other between the adjacent sides of the recesses 6 pedestals 7, each composed of the remainder of the respective side of the lower end part of the shell 2. The circular flat foot-plate 8 (Fig. 6) has lugs 9 turned up from its edges at opposite sides which are riveted or otherwise suitably fixed to the pedestals 7; the foot-plate 8 with its lugs 9 coming up between the lower ends of the pedestals (Fig. 5). This foot-plate 8 thus serves as a support for the device when it is to be used on the floor or ground, as seen in Fig. 2; the recesses 6 admitting the sides of the feet of the user who may thus stand on the projecting segmental parts of the foot-plate 8 lying within these recesses and hold the device very firmly on the floor or ground. The advantageous relation of this foot-hold to the other parts of the apparatus will be more fully noted hereinafter.

In the center of the upper head 3 is an opening in which is secured a suitable internally threaded neck 10 preferably having at its inner or lower end a screen or sieve 11 and having a plug 12 screwed into it. Upon removing the plug 12, the tank 1 may have the desired substance introduced into it; and the sieve 11 will prevent the entrance of large particles which might clog parts of the device when it is in operation. The plug 12 preferably has ears 13 with openings through them, and a lug 14 is secured on the outside of the head 3 with an opening adjacent to which one of the ears may come, so that suitable sealing means 15 may be passed through the adjacent openings and thus seal the plug 12 against unauthorized removal. This provision guards against tampering with the fire extinguisher while it is awaiting use. The lug 14 has an upward continuation at the side which preferably has a horizontal slot 14' through it to receive a suitable hasp-like hanger, whereby the entire device may be sealed to the wall or other means on which it is supported while awaiting use. It will be understood that the seal, while serving to betray any unnecessary use or tampering with the extinguisher, does not prevent the instant use of it or the refilling of it after it has been used; because the seal may always be broken by anyone who is called upon to use it and is therefore justified in breaking the seal; either the one to permit the entire device to be taken for use or the one to permit removal of the plug 12 for refilling.

The outlet pipe 16 (Fig. 11) preferably passes through the upper head 3 and downwardly along the inner side of the tank wall to which it is suitably fixed by soldering or other suitable means, and then inclines inwardly so that its lower end opens very close to the center of the lower head 4 of the tank. This outlet pipe 16 projects above the upper end of the tank and preferably has an inwardly opening check-valve 17 with a nipple 17' to which one end of the discharge hose 18 is connected. The other end of the hose 18 has the nozzle 19 which is preferably provided with a controlling cock 20 (Figs. 1 and 2) which may very conveniently be opened or closed by the thumb or finger of the hand that holds the nozzle 19.

The details of construction and arrangement that have been described are preferably common to all of the modifications which we show; the details in which the variations occur being those relating to the pump and its connections to the tank and to the provision of means for supporting the apparatus on the back of the user, as shown in Fig. 1.

As is best shown in Fig. 8, the tank has at opposite sides of its front, upper straps 21 and lower straps 22, each preferably having its end pivotally secured to the exterior of the tank shell 2. The upper straps 21 have buckles 23 at their other ends through which extend the lower straps 22. These buckles have suitable yieldable tongues 23' to frictionally engage with the lower straps 22 where they pass through the buckles 23. With this construction, the apparatus may be hung or otherwise suitably supported in a convenient position while it is awaiting use and with the straps 21 and 22 loosely adjusted so that the intending user may readily insert his arms through the loops thus formed by the straps buckled together at opposite sides of the device, and then by quick pulls on the projecting parts 22' of the lower straps 22, tighten the respective loops around the shoulders; after which the straps will be held in these tightened positions by the tongues 23' of the buckles 23. Thus the apparatus may be very quickly strapped tightly on the back of the intending user.

Our apparatus is thus provided with means for holding it on the floor or ground, or means for holding it upon the back of the user. In conjunction with these alternatively used supporting means, we provide our apparatus with a pump which may be adjusted both as to position and as to ease of operation, in accordance with either one of the alternative uses thus permitted by the two kinds of holding means.

As shown in Figs. 1 to 11, inclusive, the pump comprises a tubular barrel or casing 24, a swivel-head 25 closing one end, and a packing-head 26 closing the other end of this casing. The packing-head 26 has the stuffing-box 26' through which extends the plunger-rod 27 with a suitable handle 28 fixed on its outer end and having fixed on its inner end a plunger preferably made up of a middle disk 29 flanked by oppositely opening cups 29' of suitable packing material held against the middle disk 29 by washers 29''; the entire plunger structure being clamped on the end part of the plunger-rod 25 by a nut 30.

The casing 24 has, at one side, inlet check-valves 31 and 32, and, at the other side, outlet check-valves 33 and 34, adjacent to the packing-head 26 and swivel-head 25, respectively, these outlet valves being connected by a by-pass 35 running along the ouside of the pump casing and ending past the valve 34 in a nipple 36. When the plunger is reciprocated in the casing, air is alternately drawn into either end of the pump through the check-valves 31 and 32 and forced out from either end through the check-valves 33 and 34 along the by-pass 35 to the nipple 36, from which a flexible tube 37 leads to the interior of the tank 1, where there is preferably interposed a check-valve 38 opening inwardly of the tank, to keep the contents of the tank out of the tube 37;

which would corrode the tube if allowed to enter.

The swivel-bracket 39, riveted, soldered or otherwise suitably secured to the outside of the tank wall near its top, has a flat outer face 40 from which projects horizontally a stud 41 with a threaded end 42 (Fig. 9.) The swivel-head 25 has the upright part 43 with a flat face 44 with an opening 45 through it. This opening 45 is adapted to fit snugly around the stud 41, permitting the flat face 44 of the swivel-head 25 to fit closely against the flat face 40 of the bracket 39. A helical spring 46 around the stud 41 is clamped against the outer side of the upward extension 43 of the head 25 by means of a nut 47 and washer 48 on the threaded part 42 of the stud. The tube 37 is long enough to permit the pump to be swung through substantially a half circle from a position alongside the tank with the handle 26 downward to a position in which it extends vertically upward from the top of the tank.

For carrying the extinguisher when it is not strapped to the back, a suitable handle 49 is attached to the upper rim of the tank shell 2 at one side.

The pump is used in this upright position when the device is supported on the floor or ground and held by one or both feet in one or both of the recesses 6, as shown in Fig. 2. It is desirable to secure the pump in this upright position. Accordingly, we prefer to provide a latch 50 comprising a latch-bar 51 pivoted to swing up and down into a notch 52 in the upper end of the swivel-bracket 39 and registering notch 53 in the tank wall and flange of the head 3; this bar swinging on a transverse rod 54 suitably secured in said flange and part of the tank wall at opposite sides some distance radially inwardly of the tank from the bracket 39 (Fig. 4.) A helical spring 55 around this rod has one end 56 hooking over the bar 51 and the other end 57 extending through an opening in said flange and tank wall. The latch bar 51 extends out across the upper end 58 of the extension 43 when the pump is folded down, and this upper end is so shaped as not to disturb this bar when the pump is swung upwardly. But the lower end of the swivel-head 25 has the shoulder 59 curved eccentrically to the opening 45 and stud 41 at the sides 60, at one of which this shoulder must swing under this bar 51; and at its middle this shoulder has a notch 61 into which the bar 51 is forced by the spring 55 after having been raised by the curved part 60 as the shoulder is swung under the bar during the final stages of swinging the pump into its upright position.

It will be understood from the foregoing description that the pump is double acting; and when used as shown in Fig. 2, the user may, on account of the stable support which he can afford by standing on the footplate 8, and on account of the possibility of throwing most of the weight of his body on the downward stroke of the plunger and exerting most of the strength of his body on the upward stroke, force a very strong and very slightly interrupted supply of air into the tank at the top thereof through the check-valve 38.

With a suitable liquid contained in the tank 1, the air thus compressed on the liquid will force the liquid out from the bottom up through the outlet pipe 16, check-valve 17, hose 18 and nozzle 19; it being understood that the liquid should include such elements as will, in contact with the air, and upon emerging from the nozzle 19 onto the fire, act upon the fire in such a way as to smother it, as is well known in the art.

When the device is carried on the back of the user, however, by means of the straps, as shown in Fig. 1, the pump is adjusted to a partially lowered position as seen in Fig. 1 and as approximately indicated by one of the sets of dotted lines in Fig. 3; bringing the pump in line with the arm of the user; and in fact permitting the pump to adjust itself to the arm at each part of the stroke. The tank is very firmly held on the shoulders by the straps; but while the user may very effectively work the pump on its outward stroke when he is straightening his arm and thus providing the reaction by his back pressing against the device strapped thereon, it will be understood that on the inward stroke, when he is pulling on the handle 28, the reaction must all be provided by the straps holding the device to his back. Also, as is well known, a person cannot exert as much force in retracting the arm as in extending it. In order to compensate for this relative weakness of the operator and the less secure support of the device by the straps alone on the inward stroke, it is highly desirable to prevent compression by the pump on this inward stroke and rely merely on the compressions afforded by the outward strokes for operating the device. Accordingly, we provide for opening the inner end of the pump casing to the atmosphere when it has any but an upright position in which it is suitable for operating while supported upon the floor or ground, as shown in Fig. 2.

As here shown, the swivel-head 25 has a port 62 extending upwardly and inwardly and opening through the flat face 44 of the swivel-head just above the notch 61. The swivel-bracket 39 has in its flat face 40, a groove 63 extending across it in an arc following the path of the opening of the port 62 as it is swung across the face 40 in adjusting the pump. But the upper half of the face 40 has no such groove, and when the pump is in upright position, the port 62 will merely open against the flat face 40 against which the flat face 44 of the swivel-head is tightly pressed by the spring 46. Thus air from the inner end of the pump can escape through the port 62 and groove 63 when the pump is in position for operating while the device is held on the back as in Fig. 1, and the operator will have only to overcome the resistance of the air through the pump and its passages on the inward stroke. He can thus make this stroke very quickly without fatigue and without undue strain on the supporting straps and reserve his strength for each outward stroke which may be powerfully executed to force out the liquid with the results hereinbefore alluded to. But when the pump is adjusted into upright position, the means for this escape of the air on the inward stroke is automatically closed and the pump is at once changed from a single acting to a double acting pump without any need of special attention from the operator.

In the modification shown in Figs. 12 and 13, there is substituted for the flexible tube 37 and check-valve 38 a modified swivel-head 64 and modified swivel-bracket 65 with means for the passage of the air from the pump through these into the tank.

The swivel-head 65 has its stud 66 somewhat enlarged for some distance out therefrom, with a port 67 opening downwardly through one side of the stud and opening inwardly into a valve cavity 68 next to an opening 69 in the tank shell 2. An inwardly opening check-valve 70 in this cavity 68 keeps the corrosive contents of the tank out of the bearings on the stud 66. The swivel-head 64 has a hub extended out around the enlarged part of the stud 66 with an internal annular groove 71 around the stud, so that the port 67 opens into this groove in any position into which the pump is adjusted. A port 72 leads from the inner end of the pump into this groove 71. A gasket 73 is held by a washer 74 against the shoulder 75 of the outer end of the enlarged part of the stud 66 and against the surrounding face of the hub of the swivel-head 65, thus transmitting the pressure of the spring 46 to the bearing of the swivel-head against the swivel-bracket, and also part of this pressure, due to the elasticity of the gasket 73, to the adjacent surfaces of the stud and swivel-head to prevent leakage around the stud from the groove 71.

It will be understood from the foregoing that our invention is susceptible to considerable modification, and therefore we do not wish to be understood as being limited to the precise details of the examples shown and described, but what we claim as new and desire to secure by Letters Patent is:

1. In a fire-extinguisher, a reservoir for the extinguishing substance comprising an upright shell and upper and lower heads in said shell, said lower head being spaced up from the bottom of said shell, and said shell having a recess at one side below said lower head from the bottom of the shell upward, a foot-hold element secured in said shell adjacent to said recess, a pump for applying said extinguishing substance, pivotally connected to one side of said reservoir to be folded alongside said reservoir and thus extend alongside said recess, or to be swung to various other positions on said reservoir, a conducting connection from said pump into said reservoir, and an outlet from said reservoir for said extinguishing substance through which said substance is forced by said pump.

2. In a fire-extinguisher, a reservoir for the extinguishing substance comprising an upright shell and upper and lower heads in said shell, said lower head being spaced up from the bottom of said shell, and said shell having a recess at one side below said lower head from the bottom of the shell upward, a foot-hold element secured in said shell adjacent to said recess, a pump for applying said extinguishing substance, pivotally connected to one side of said reservoir to be folded alongside said reservoir and thus extend alongside said recess, or to be swung to various other positions on said reservoir a conducting connection from said pump into said reservoir, an outlet from said reservoir for said extinguishing substance through which said substance is forced by said pump, and readily adjustable straps secured to sides of said reservoir for supporting said fire-extinguisher on the back of a person.

3. In a fire-extinguisher, a reservoir for the extinguishing substance comprising an upright shell and upper and lower heads in said shell, said lower head being spaced up from the bottom of said shell, and said shell having a recess at one side below said lower head from the bottom of the shell upward, a foot-hold element secured in said shell adjacent to said recess, a pump for applying said extinguishing substance, pivotally connected to one side of said reservoir to be folded alongside said reservoir and thus extend alongside said recess, or to be swung to various other positions on said reservoir, a conducting connection from said pump into said reservoir, an outlet from said reservoir for said extinguishing substance through which said substance is forced by said pump, and means to lock said pump in one of said other positions.

4. In a fire-extinguisher, a reservoir for the extinguishing substance comprising an upright shell and upper and lower heads in said shell, said lower head being spaced up from the bottom of said shell, and said shell having a recess at one side below said lower head from the bottom of the shell upward, a foot-hold element secured in said shell adjacent to said recess, a pump for applying said extinguishing substance, pivotally connected to one side of said reservoir to be folded alongside said reservoir and thus extend alongside said recess, or to be swung to various other positions on said reservoir, a conducting connection from said pump into said reservoir, an outlet from said reservoir for said extinguishing substance through which said substance is forced by said pump, means whereby said pump is double-acting when in one of said other positions, and means to render it single-acting in another one of said other positions by the act of changing to this other one of said other positions, or to render said pump double-acting when it is returned to the first one of said other positions, by the act of returning.

5. In a fire-extinguisher, a reservoir for the extinguishing substance comprising an upright shell and upper and lower heads in said shell, said lower head being spaced up from the bottom of said shell, and said shell having a recess at one side below said lower head from the bottom of the shell upward, a foot-hold element secured in said shell adjacent to said recess, a pump for applying said extinguishing substance, pivotally connected to one side of said reservoir to be folded alongside said reservoir and thus extend alongside said recess, or to be swung to various other positions on said reservoir, a conducting connection from said pump into said reservoir, an outlet from said reservoir for said extinguishing substance through which said substance is forced by said pump, means whereby said pump is double-acting when in one of said other positions, means to render it single-acting in another one of said other positions by the act of changing to this other one of said other positions, or to render said pump double-acting when it is returned to the first one of said other positions, by the act of returning, and means to lock said pump in said position in which it is double-acting.

6. In a fire-extinguisher, a reservoir for the extinguishing substance, having an outlet for said substance, a normally double-acting pump, conducting means from both ends of said pump into said reservoir, and a pivotal connection between said pump and said reservoir comprising two surfaces in contact, said pump having an outlet from its end adjacent to said reservoir through one of said surfaces, kept closed by the other one of said surfaces when said pump is swung on said connection to an upright position on said reservoir, but this other surface having an interruption opposite which said opening comes when said pump is swung down alongside said reservoir, for the purposes set forth.

7. In a fire-extinguisher, a reservoir for the extinguishing substsance, having an outlet for said substance, a normally double-acting pump, conducting means from both ends of said pump into said reservoir, a pivotal connection between said pump and said reservoir comprising two surfaces in contact, said pump having an outlet from its end adjacent to said reservoir through one of said surfaces, kept closed by the other one of said surfaces when said pump is swung on said connection to an upright position on said reservoir, but this other surface having an interruption opposite which said opening comes when said pump is swung down alongside said reservoir, for the purposes set forth, and means to lock said pump in said upright position.

8. In a fire-extinguisher, a reservoir for the extinguishing substance, having an outlet for said substance, a normally double-acting pump, conducting means from both ends of said pump into said reservoir, a pivotal connection between said pump and said reservoir comprising two surfaces in contact, said pump having an outlet from its end adjacent to said reservoir through one of said surfaces, kept closed by the other one of said surfaces when said pump is swung on said connection to an upright position on said reservoir, but this other surface having an interruption opposite which said opening comes when said pump is swung down alongside said reservoir, for the purposes set forth, said reservoir being made up of an upright shell and upper and lower heads in said shell, said lower head being spaced up from the bottom of said shell, and said shell having a recess at one side below said lower head from the bottom of the shell upward, and a foot-hold element secured in said shell adjacent to said recess.

9. In a fire-extinguisher, a reservoir for the extinguishing substance, having an outlet for said substance, a normally double-acting pump, conducting means from both ends of said pump into said reservoir, a pivotal connection between said pump and said reservoir comprising two surfaces in contact, said pump having an outlet from its end adjacent to said reservoir through one of said surfaces, kept closed by the other one of said surfaces when said pump is swung on said connection to an upright position on said reservoir, but this other surface having an interruption opposite which said opening comes when said pump is swung down alongside said reservoir, for the purposes set forth, said reservoir being made up of an upright shell and upper and lower heads in said shell, said lower head being spaced up from the bottom of said shell, and said shell having a recess at one side below said lower head from the bottom of the shell upward, and a foot-hold element secured in said shell adjacent to said recess, and confined entirely within the limits of said shell.

10. In a fire-extinguisher, a reservoir for the extinguishing substance, an outlet for the substance, a pump adjustably connected to said reservoir and communicating with the interior of said reservoir at all of its adjustments, for forcing air into said reservoir to expel said substance through said outlet, and means to render said pump double-acting at some of said adjustments and single-acting at other ones of said adjustments.

11. In a fire-extinguisher, a reservoir for the extinguishing substance, an outlet for the substance, a pump adjustably connected to said reservoir and communicating with the interior of said reservoir at all of its adjustments, for forcing air into said reservoir to expel said substance through said outlet, means to render said pump double-acting at some of said adjustments and single-acting at other ones of said adjustments, and means to lock said pump in one of its adjustments in which it is double-acting.

ALBERT B. PHISTER.
BENJAMIN H. PHISTER.

Witnesses:
JAMES N. RAMSEY,
CLARENCE PERDEW,
HELEN MAIER,
IRENE PARKER.